United States Patent Office 3,081,109
Patented Mar. 12, 1963

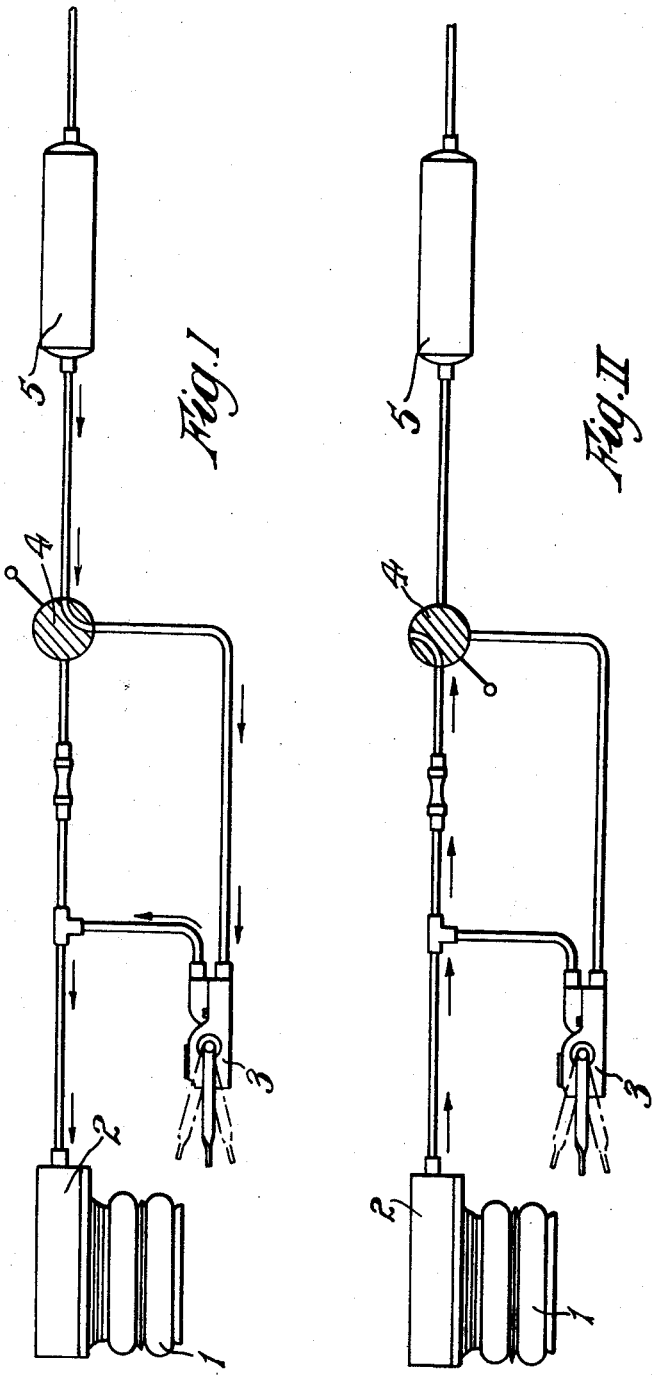

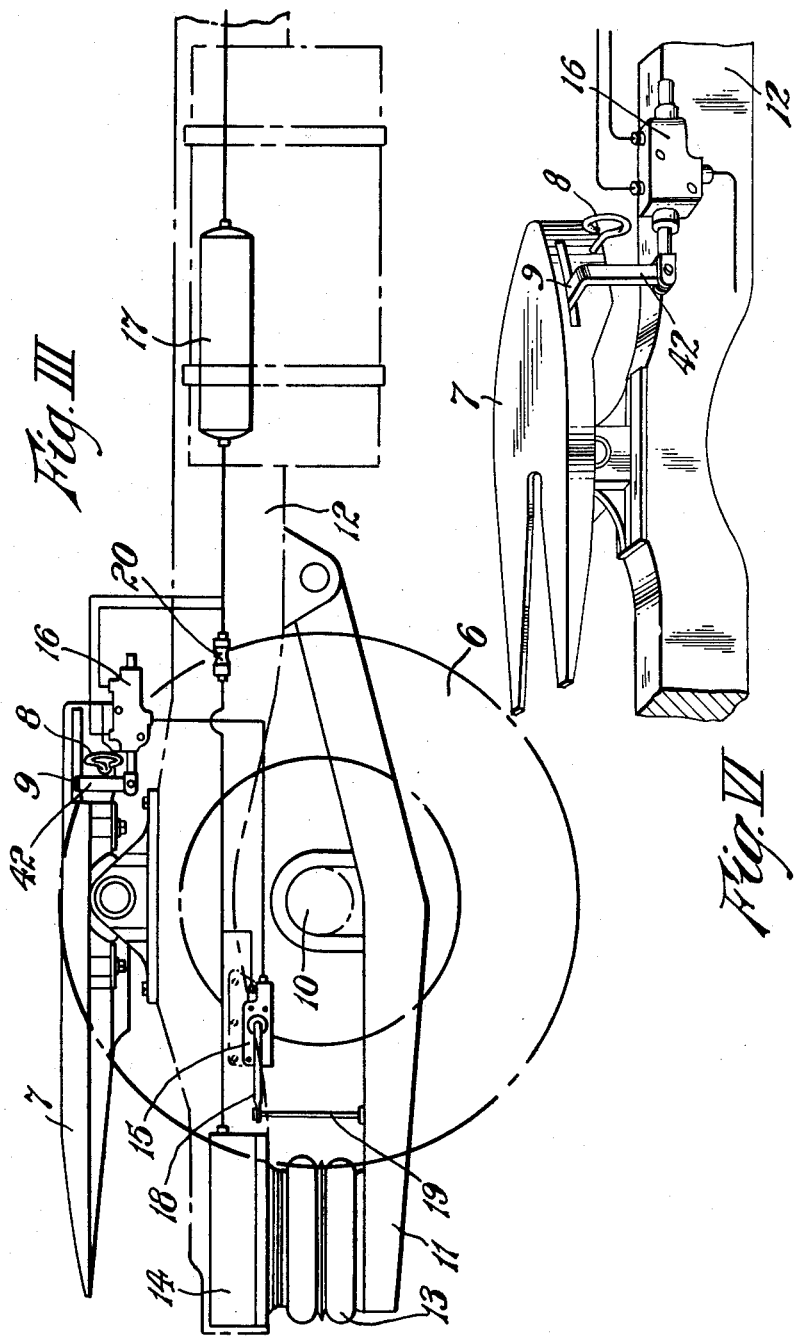

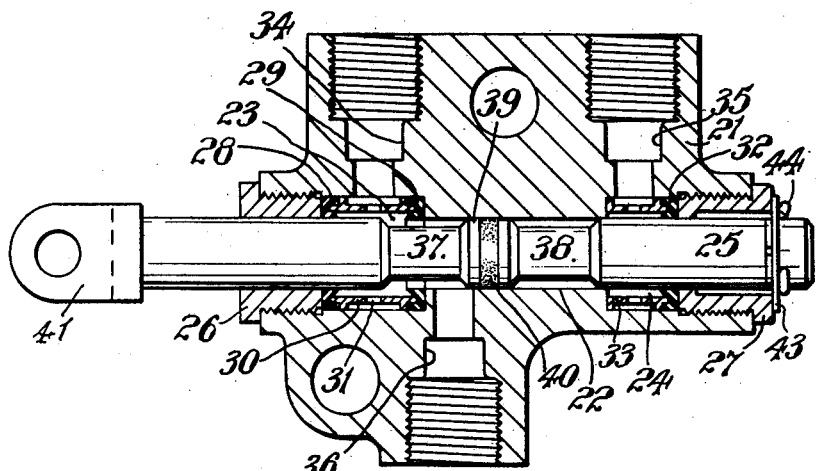
Fig. IV
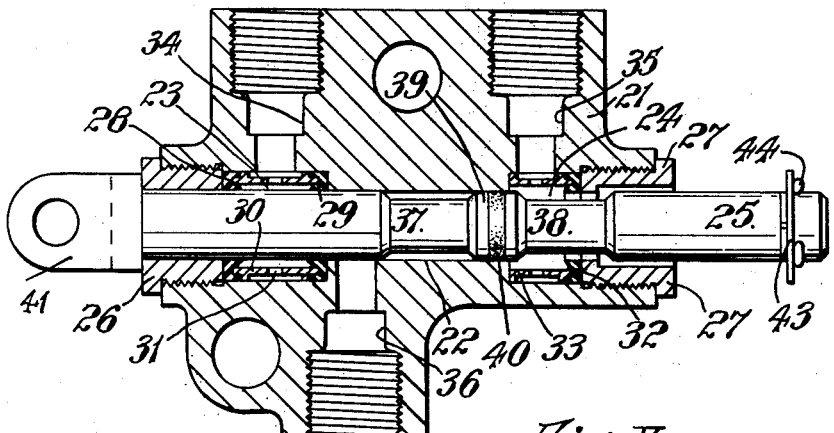
Fig. V

3,081,109
FLUID-PRESSURE SUSPENSION SYSTEM FOR A TRACTOR SEMI-TRAILER ASSEMBLY HAVING A COUPLING CONTROLLED RELEASE
Raymond John Davies and Peter Derek Mills, Coventry, England, assignors to Dunlop Rubber Company Limited, London, England, a British company
Filed Jan. 23, 1961, Ser. No. 84,446
Claims priority, application Great Britain Feb. 6, 1960
4 Claims. (Cl. 280—423)

This invention relates to a suspension system for a vehicle and more particularly relates to a fluid-pressure suspension system for a tractor of the kind used for supporting and towing a wheeled container or semi-trailer.

Tractor and trailer assemblies are known of the kind comprising a trailer, the forward end of which is supported by the tractor and is disconnectably secured thereto in an articulated manner. The rear wheel springs of the tractor support not only the rear of the tractor but also a proportion of the weight of the trailer when it is connected thereto. Said springs may be of the fluid-pressure type and controlled by a levelling valve. When the tractor is uncoupled and driven away from the trailer, the springs, which hitherto had supported the trailer and were under considerable pressure, are suddenly substantially unloaded so that, before the levelling valve can operate to reduce the internal pressure, they extend in a violent or uncontrolled manner and in doing so may be damaged and may cause damage to the rebound restricting slings.

The object of the present invention is to provide a fluid-pressure suspension system for tractor/trailer assemblies wherein this difficulty is overcome.

According to the present invention a fluid-pressure suspension system for a tractor/semi-trailer assembly comprises fluid springs associated with the rear wheels of said tractor, a coupling device between the tractor and semi-trailer and means associated with the coupling device automatically to exhaust the fluid springs when the coupling device is operated to allow the tractor to separate from the semi-trailer.

Said means preferably comprises a two-way valve operated by movement of a tractor coupling pin in such a manner that when the pin is in engaged or connected position the two-way valve connects the springs through levelling valves to a source of fluid-pressure but when the pin is in disengaged or disconnected position the two-way valve connects the springs to exhaust or a liquid reservoir.

One suspension system constructed in accordance with one embodiment of the invention will now be described by way of example with reference to the accompanying drawings, in which:

FIGURE I shows a suspension system with a two-way valve in the normal position,
FIGURE II shows the system with the valve in the exhaust position,
FIGURE III shows a suspension system applied to a tractor for a semi-trailer,
FIGURE IV is a detailed cross-sectional view of the two-way valve in the normal position, and
FIGURE V shows the valve also in more detail in the exhaust position.
FIG. VI is a perspective view taken downwardly on an angle to the tractor to show the operative levers for connecting the tractor to a trailer.

In FIGURES I and II there is shown a pneumatic air-spring 1 of the bellows type having a surge tank 2 associated therewith connected through one arm of a two-way connection to a levelling valve 3, to one port of a two-way valve 4 comprising an ordinary rotatable cock and a reservoir 5. The other arm of the two-way connection is connected to the other port of the two-way valve. In FIGURE I the valve 4 is shown in its normal position when a trailer is secured to the tractor with the springs 1 connected through the levelling valve 3 to the air reservoir 5. In FIGURE II the valve 4 is shown open to the atmosphere immediately prior to securing the trailer to, or removing it from, the tractor.

A suspension system is shown secured to a tractor in FIGURE III. The tractor is provided, between the rear wheels 6, with a ramp or skid 7 which, when the tractor is reversed into position to pick up the semi-trailer, jacks the semi-trailer up off its supporting bogey. Coupling of the semi-trailer is effected by clamping a pair of jaws around a pin on the semi-trailer and this and withdrawal of the jaws may be done manually by the pin 8 and the lever 9.

The ends of the rear wheel axle 10 of the tractor are each secured intermediate the ends of an arm 11 which is pivotally secured at its forward end to the tractor chassis member 12. Located between the trailing end of each arm and said chassis member 12 is a pneumatic spring 13 of the bellows type having a surge tank 14 associated therewith.

The surge tank 14 is connected through a levelling valve 15 to a two-way valve 16 and then to an air reservoir 17 and a compressor. The levelling valve 15 is associated with the arm 11 and chassis 12 by means of lever 18 and rod 19. An additional air-line connects the two-way valve 16 with the line connecting the surge tank 14 to the levelling valve 15. A pressure-maintaining valve 20 is interposed in the air-line between the surge tank 14 and the reservoir 17.

The two-way valve 16, as illustrated in FIGURES IV and V, comprises a housing 21 having a central bore 22 therethrough in which are formed two chambers 23 and 24, spaced axially apart. A plunger 25 is provided slidable in said bore 22 and the chambers 23 and 24. Bushes 26 and 27 are screwed into the outwardly facing ends of the chambers 23 and 24. Bush 27 is drilled longitudinally to two diameters, one larger than that of the plunger but for a short distance at its inward end to a diameter equal to that of the bore 22. Bush 26 is drilled to a diameter equal to that of the bore 22. Sealing rings 28 and 29 are provided in said chamber 23 to prevent the escape of air from said chamber 23 between said bore 22 and said plunger 25. The sealing rings 28 and 29 are retained in the chamber 23 by means of a cylindrical retaining member 30 which is provided with one or more air-transfer ports 31. The chamber 24 is also provided with a sealing ring 32 between the bush 27, the chamber 24 and the plunger 25 which is also retained within said chamber by cylindrical retaining means 33.

The housing 21 is provided with a connection 34 leading from chamber 23 to the air reservoir 17 and also with a connection 35 leading from the chamber 24 direct to the surge tank 14 and the air-spring 13. A third connection 36 slightly axially-offset from the connection 34 leads from the bore 22 to the levelling valve 15.

The plunger 25 is provided with two reduced diameter parts 37 and 38 and the portion 39 between said parts 37 and 38 is provided with a sealing ring 40 to prevent leakage of air from one of said parts to another. The arrangement is such that, with the plunger 25 in one end position, as shown in FIGURE IV, there is free passage from the reservoir 17 to the connection 34 and chamber 23 associated therewith, through the reduced diameter part 37 of the plunger 25 and through connection 36 to the levelling valve 15. In the other end position, as shown in FIGURE V there is free passage from the surge tank 14 and air-springs 13, through the connection 35 and chamber 24 associated herewith, through the reduced diameter part 38 and thence to exhaust through bush 27.

The plunger 25 is connected at the end adjacent chamber 23 through connecting means 41 and a lever 42 to the lever 9 so that the plunger 25 is automatically moved to one position as the semi-trailer is coupled up and moved to the other position as the coupling lever 9 is moved to uncouple the trailer. Excessive axial movement of the plunger 25 is prevented by an annulus 43 retained in a groove in the plunger 25 by a circlip 44.

The system operates as follows. With the tractor uncoupled and the coupling pin 8 in position the two-way valve 16 connects the air reservoir 17 with the levelling valve 15 so that the air-springs 13 are conventionally inflated to provide a predetermined levelled height to the tractor chassis. Before the tractor backs up to connect to a semi-trailer the driver withdraws the coupling pin 8 and moves lever 9 to open the jaws which, at the same time moves the valve plunger 25 to immediately exhaust the springs 13 and the surge tanks 14 at the rear of the tractor. This lowering of the tractor chassis facilitates connecting up to the semi-trailer.

With the semi-trailer in connected position the driver inserts or engages the coupling pin 8 and moves the lever 9 to close the jaws. This may, however, be done automatically as coupling takes place. This again actuates the two-way valve 16 to connect the air reservoir 17 to the levelling valve 15 so that the springs 13 can now be inflated to a value determined by the levelling valve and taking into account the additional weight of the semi-trailer being supported on the springs.

When it is required to disconnect the semi-trailer this is done by withdrawing the coupling pin 8 moving the lever 9 to open the jaws and driving the tractor out of engagement with the trailer and then replacing the coupling pin. As the coupling pin 8 is withdrawn and the lever 9 moved the two-way valve 16 immediately exhausts the springs 13 and surge tanks 14 so that there is now no possibility, as the tractor is driven away, of the springs 13 extending in a violent and uncontrolled manner when the load is removed. When the driver re-inserts the pin and moves lever 9 the two-way valve 16 is again moved to connect the springs 13 to the reservoir 17 through the levelling valves 15 as hereinabove described.

The advantage of the system described is that the pressure from the springs and surge tanks is released automatically on removing the coupling pin without at the same time exhausting the main reservoir and the rest of the system. The springs are prevented from uncontrolled extension and thus damage to the springs and rebound restricting slings is prevented. Since only a portion of the system is exhausted the springs may more quickly be inflated to operable condition when the coupling pin is re-inserted.

Although a pneumatic system is herein described hydraulic liquid may be used instead of air. Any convenient type of spring, such as a rolling lobe diaphragm, piston and cylinder or the like, may be employed to replace the bellows herein described.

Having now described our invention, what we claim is:

1. A fluid-pressure suspension system for a tractor/semi-trailer assembly which comprises fluid springs associated with the rear wheels of said tractor, a coupling device between the tractor and the semi-trailer and means actuated by said coupling device upon release of said coupling device to exhaust the fluid springs, and means comprising a two-way valve and at least one levelling valve controlling the admission of fluid to said spring, said two-way valve having an inlet port, a port to said levelling valve, an exhaust port and a port connected to said fluid spring, and means actuated by said coupling means alternatively to connect said inlet port to said levelling valve and to connect said port connected to said fluid spring to said exhaust port.

2. A pneumatic suspension system according to claim 1 wherein said two-way valve comprises a housing having a cylindrical bore, a plunger slidable air-tightly in said bore, a connection leading from said bore to the levelling valves and then to the springs, a connection leading from said bore to said pressure source and a further connection leading from said bore to said springs, and means to connect said plunger to the coupling device whereby engagement of the coupling device effects axial movement of the plunger in one direction to effect communication of said levelling valves with said pressure source and disengagement of said coupling device effects axial movement of the plunger in the opposite direction to exhaust said springs.

3. A pneumatic suspension system according to claim 2 wherein said cylindrical bore is extended radially to form two chambers, one at each end of said bore, one of said chambers being provided with said connection leading to said levelling valves and the other chamber being provided with said further connection leading to said springs, said connection to said pressure source leading from said bore being positioned axially offset with respect to the first of said connections and said plunger being provided with two reduced diameter parts, one on each side of air-sealing means between said plunger and said bore, whereby axial movement of said plunger effects communication of the levelling valves and said springs through one of the reduced diameter parts to said pressure source and axial movement in the opposite direction effects connection of said springs to exhaust through the other reduced diameter part.

4. A fluid-pressure suspension system according to claim 1 wherein said two-way valve comprises a cock rotatable alternatively to a position to close said exhaust port and connect said inlet port to said levelling valve and in the alternate position to connect said fluid spring to said exhaust port and to close said inlet port from said levelling valve.

References Cited in the file of this patent

UNITED STATES PATENTS

| | | |
|---|---|---|
| 2,733,931 | Reid | Feb. 7, 1956 |
| 2,938,704 | Quail | May 31, 1960 |
| 2,968,496 | Gouirand | Jan. 17, 1961 |
| 2,971,499 | Crulett | Feb. 14, 1961 |